Nov. 8, 1966     T. G. BIXBY     3,284,145
SEALED ANTI-FRICTION BEARING
Original Filed Feb. 18, 1963     2 Sheets-Sheet 2
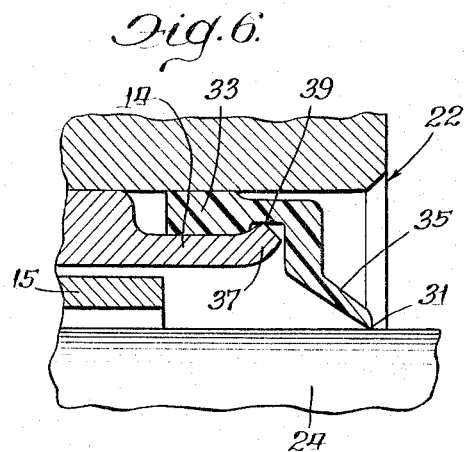
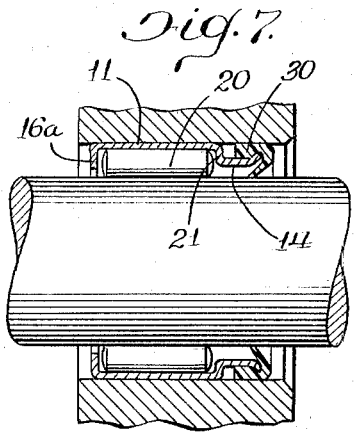
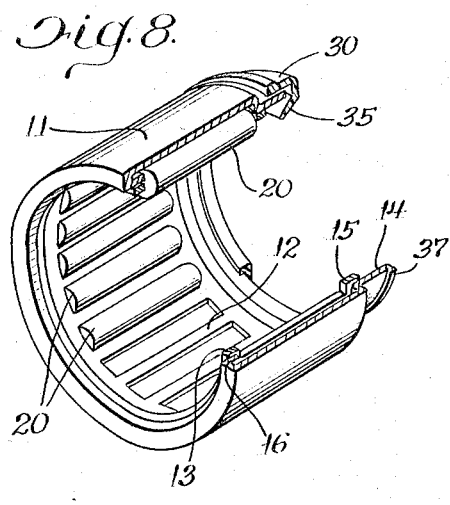
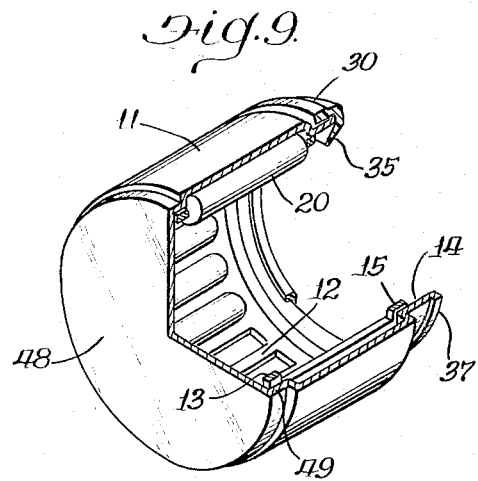
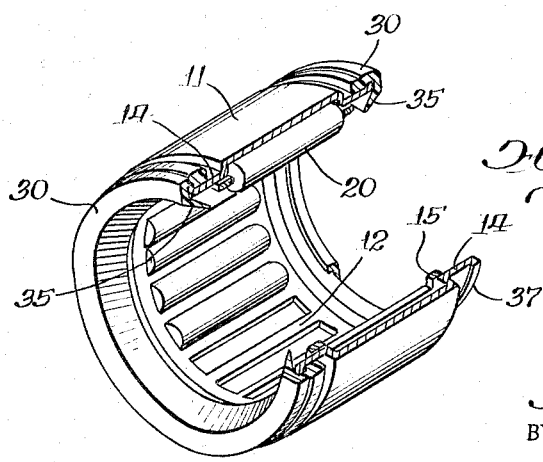
INVENTOR.
Thomas G. Bixby
BY Mueller & Aichele
Attys.

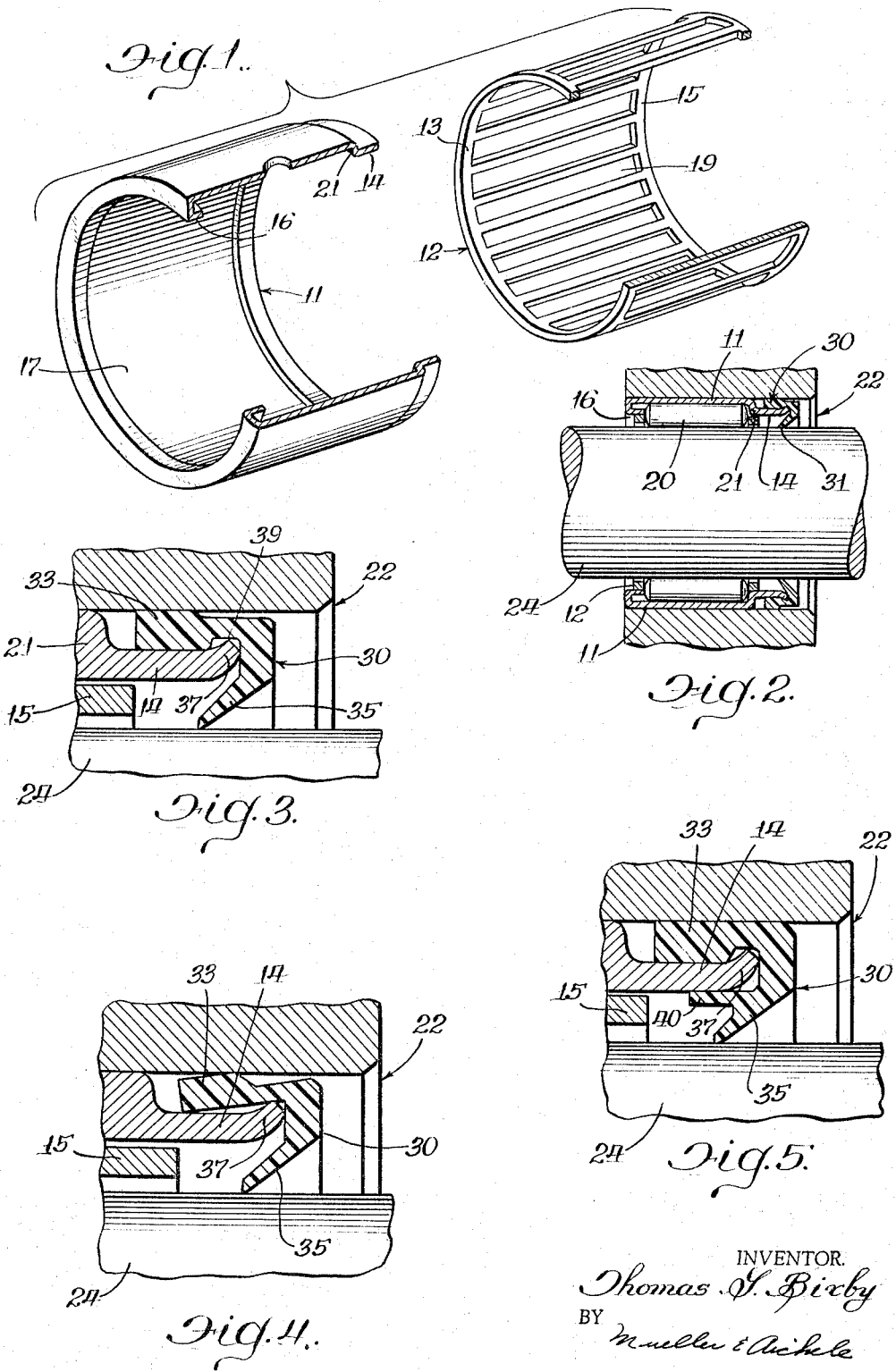

United States Patent Office 3,284,145
Patented Nov. 8, 1966

3,284,145
SEALED ANTI-FRICTION BEARING
Thomas G. Bixby, Valparaiso, Ind., assignor to McGill Manufacturing Company, Inc., Valparaiso, Ind., a corporation of Indiana
Continuation of application Ser. No. 259,218, Feb. 18, 1963. This application June 7, 1965, Ser. No. 464,597
5 Claims. (Cl. 308—187.2)

This application is a continuation of application Serial No. 259,219, filed February 18, 1963, and now abandoned.

This invention relates to anti-friction bearing assemblies and in particular to improved sealing means for roller or needle bearing assemblies of the type utilizing a thin-walled outer housing to contain and to provide an outer raceway for the rollers or needles of the assembly.

Bearing assemblies with a thin-walled outer housing, which housing may be of the drawn shell type, provide an extremely low cost, compact, precision bearing with high load capabilities, and with their development it has been possible to utilize bearing assemblies of the roller or needle type in applications where such had been previously considered commercially unfeasible. Such assemblies may include caged and guided rollers, with a retention cage maintained in land-riding relationship on a radially inwardly extending shoulder at the axial ends of the housing, or may contain a full complement of rollers, with axial thrust sustaining flanges directed radially inwardly at the axial ends of the housing.

In many applications it is desirable to provide seals for the bearing assembly when in operating installation at one or both of its axial ends to retain lubricant within the bearing and/or to exclude foreign particles therefrom. However, known types of end seals for roller bearing assemblies increase cost and the size of the assembly to an extent that the advantages of the thin-walled shell type structure are lost and their use becomes economically unfeasible.

Many types of known sealing arrangements, when adapted for use with a thin-walled structure of the above-described type, require a complex configuration which is expensive and space consuming, thereby detracting from the advantages which can be derived from bearing assemblies of this type. Some sealing arrangements, particularly those of the labyrinth type, require grooves in the bearing races and are not practical for use with a structure having a thin walled shell housing. In addition, seals of leather, felt and the like require a metallic backing plate for a substantial portion of their radial dimension to provide the necessary structural rigidity and accordingly are expensive to fabricate. With such a structure the possibility of binding on the shaft with severe usage increases. And although in certain instances the metal backed leather or felt sealing means may be replaced by resilient plastic or nylon, in the usual type of configuration the sealing means makes a press fit with either the outer or inner races of the assembly and accordingly may become loose because of expansion and contraction of the nylon or plastic. Thus, in such applications shoulders and/or grooves are necessary in the bearing races or housing structure to prevent axial displacement of the sealing means and many sealing arrangements require that the end seals be inserted in place upon final assembly of the bearing in operating installation and accordingly increase assembly time, as well as requiring more care in the handling and shipping of the related parts.

It is therefore an object of the present invention to provide an improved sealed bearing assembly that is economical to fabricate.

A further object is to provide a bearing assembly of the type utilizing a thin walled housing, which assembly is provided with economical, compact and efficient end seals for the retention of lubricant within the assembly and the exclusion of foreign particles therefrom.

A further object of the invention is to provide an inexpensive bearing assembly of the anti-friction type having simple yet effective contact end seals molded of firm, resilient, non-metallic material which is easily positioned on an assembled bearing and which will not become loosened by expansion or contraction.

Still another object is the provision of an improved anti-friction bearing assembly incorporating end seals which are retained in place on the assembled bearing for ease of assembly in operating installation and for convenience in shipping and handling.

A feature of the present invention is the provision of an anti-friction bearing assembly having a thin walled outer housing with an axially extending flange on at least one end thereof, and molded annular sealing means secured in position by the flange having a resilient, radially extending lip to provide a contact seal with the shaft of the rotating member utilized with the assembly.

A further feature is the provision, in a bearing assembly of the above described type, of a flared axial end portion on the flange of the shell housing, with the annular sealing means inserted between the flared flange and the bore of the structure receiving the bearing assembly to provide a combined friction fit and mechanical locking arrangement which prevents axial displacement of the annular sealing means. This structure further insures that the sealing means will not become loose with either expansion or contraction, and allows the sealing means to be positioned on the flange of the shell housing prior to assembly in operating installation to facilitate handling and shipping of the bearing assembly.

Still another feature is the provision of molded nylon, plastic, or hard rubber sealing means for use in bearing assemblies of the type described, which sealing means has a radially inwardly extending resilient lip portion to make a contact seal with the shaft or rotating member with which the bearing assembly is utilized. The resilient lip portion of the sealing means may extend angularly inwardly for maximum lubricant retention or angularly outwardly for maximum protection against axially directed foreign particles.

Other objects, features and attending advantages of the invention will become apparent from the following description when taken in conjunction with the accompanying drawings in which:

FIG. 1 is a perspective view of the thin walled housing and retainer for use with the bearing assembly of the invention;

FIG. 2 is a cross-sectional view of the bearing in operating installation;

FIG. 3 is an enlarged cross-sectional view emphasizing the sealing means of the bearing in operating installation;

FIGS. 4 and 5 are enlarged cross-sectional views of other embodiments of the sealing means in operating installation;

FIG. 6 is an enlarged view showing a further embodiment in which the lip portion of the sealing means is adapted to provide maximum protection against axially directed foreign particles;

FIG. 7 is a cross-sectional view of an embodiment of the bearing in operating installation utilizing a full complement of rollers; and FIGS. 8–10 are perspective views illustrating completed bearing assemblies according to the invention.

In practicing the invention the thin walled outer housing which defines the outer raceway of a roller bearing assembly is provided with an integral flange extending axially outwardly from at least one end thereof. Preferably, and to produce a low cost unit, the outer housing is fabricated from a drawn cup to provide a drawn shell housing. It is to be understood, however, that the thin walled outer housing may also be machined or ground to provide the desired configuration. The axial innermost portion of the flange is provided with an annular shoulder which maintains the retention cage of the assembled bearing in land riding relationship and to receive axial thrust of the rollers carried by the retention cage when caged and guided rollers are used, and which abuts against the axial ends of the rollers for axial guidance when a full complement of rollers is used. The axial outermost portion of the flange is flared to aid in securing the sealing means thereto, as hereinafter described.

The sealing means is a molded annular ring of suitable material such as nylon, plastic, or hard rubber and has an axially directed peripheral member to provide a pair of coaxial annular surfaces and a radially inwardly directed lip portion to provide a contact seal with the shaft or rotating member which utilizes the bearing assembly. The axially directed peripheral member of the sealing means is inserted between the flange of the shell housing and the internal diameter of the bore of the structure utilizing the bearing assembly. The inner annular surface of the axially directed peripheral member of the sealing means makes a friction fit with the flange of the shell housing, while in operating installation is outer annular surface makes an interference fit with the internal diameter of the bore of the structure utilizing the bearing assembly. In addition, the flared axial end of the flange of the shell housing provides a reduced opening with the bore so that mechanical locking is achieved in operating installation to further prevent displacement by axially directed forces or lubricant pressure.

Referring now to the drawings, FIG. 1 illustrates the manner in which a retention cage may be utilized with a sealed bearing according to the invention. Thin-walled housing 11 receives retention cage 12 so that when assembled circular rim portions 13 and 15 are in land-riding relationship with the internal annular surface of flange 14 and lip 16. The major internal cylindrical surface 17 of housing 11 lying between flange 14 and lip 16, functions as a raceway for the rollers of the assembled bearing. For an economical bearing assembly, housing 11 may be conveniently fabricated by a drawing process and typically is approximately .030 inch thick in its major body portions, with slightly thinner dimensions for flange 14 and lip 16 due to deformation during the drawing process.

Retention cage 12 is fabricated from strip steel and pockets 19 are stamped out with the stock in flat strip form. It is then formed into a cylindrical shape and the free ends thereof welded together. The outer peripheral surfaces of rim portions 13 and 15 are dimensioned to provide loose fit with the inner annular surfaces of flange 14 and lip 16 so that in operating installation the retention cage is free to rotate with respect to the shell. Rollers or needles are inserted in pockets 19 so that in assembled condition they ride in outer raceway 17 of shell 11, with pockets 19 spaced to prevent the rollers from falling inwardly of the assembled bearing. As can be best seen in FIG. 2, offset portion 21 of flange 14, as well as the inner edge of lip 16, provide axial guidance of the rollers for an assembled bearing. It is to be understood that in applications where a full complement of rollers is preferred and retention cage 12 is not used, the rollers may be disposed around outer raceway 17, with their axial ends abutting against offset portion 21 and a radially inwardly extending flange at the opposite end of shell housing 11.

As shown in FIG. 2, the bearing assembly including shell 11, retention cage 12, and rollers 20 is inserted into bore 22 of a structure utilizing the bearing with the assembly maintained in position by a press fit between the inner diameter of bore 22 and the outer diameter of shell 11. Shaft or rotating member 24 extends through the bearing assembly, providing an inner face for rollers 20 so that the shaft is free to rotate within the bearing assembly. End seal 30 is positioned on flange 14 so that an axially directed annular portion thereof is secured between the inner diameter of bore 22 and the outer diameter of flange 14. A radially inwardly extending lip portion on end seal 30 having a cross-section substantially less than the cross-section of the axially directed annular section provides a contact seal with shaft 24 at point 31. Seal 30 may be of molded plastic, nylon or hard rubber and is essentially rigid yet sufficiently resilient and thin because of the inclined cross-section, that the inwardly extending lip portion makes a substantially heavy interference contact with shaft 24. Nylon and many plastic materials are easily moldable to close dimensional tolerances, and further have self-lubricating properties which make them desirable where a firm sliding contact seal is used. Hard rubber, also readily moldable, may also be used. The molded rubber seal may be provided with an extending lip portion which is somewhat less hard than the annular peripheral portion in instances where a less firm contact seal is desired.

With such molded end seals, frictional drag on shaft 24 is minimized, and the downwardly extending lip portion of seal 30 is sufficiently flexible to allow shaft 24 to be easily assembled with the bearing. As can be seen in more detail in FIGS. 3 and 5, seal 30 is an integral member which comprises an axially directed portion 33 which has inner and outer annular surfaces to provide a friction fit between the internal diameter of bore 22 and the outer periphery of flange 14, and a radially inwardly extending portion 35 which provides a line contact around the periphery of shaft 24. The outer periphery of axially directed portion 33 may be provided with a relief, as in FIGS. 3 and 4, so that in cross-section it is thicker in areas which are directed inwardly upon assembly with the bearing.

As seen in the embodiment of FIG. 3, flange 14 is provided with a radially outwardly flared axial end 37 adapted to be seated in notch or groove 39, annularly disposed around the inner peripheral surface of axially directed portion 33 of seal 30. The radii of the inner and outer surfaces of portion 33 of the seal define a radial cross-section dimensioned to provide friction fit with the internal diameter of bore 22 as well as with the outer diameter of flange 14 to confine the seal therebetween, while the engagement of flared end 37 in notch 39 further prevents outward axial displacement of seal 30. It should be noted that in this configuration expansion of seal 30 will increase the pressure of its fit with bore 22, while contraction of seal 30 increases the pressure of the fit with flange 14 and of engagement of flared end 37 with groove 39. Thus, a possibility of seal 30 becoming loosened and forced out of the assembly bearing by lubricant pressures and by temperature changes under severe operating conditions is eliminated.

In the embodiment of FIG. 4, the inner annular surface of axially directed portion 33 of seal 30 is flat so that when inserted over flange 14 it is maintained in a slightly canted or tilted position by the radially outwardly extending flared end 37 of flange 14. A firm contact is made with the internal diameter of bore 22 and the outer periphery of flange 14 by the outer and inner annular surfaces of portion 33 of seal 30 thereby radially confining the seal 30, and since the opening between flared end 37 and bore 22 is reduced mechanical locking is achieved. In this embodiment seal 30 has a somewhat simpler configuration for more economical molding, while the dimensions of the radii for the outer and inner annular surfaces of axially directed portion 33 is not as critical in providing a press fit with the internal diameter of bore 22 and the outer diameter of flange 14. Because of the tilt applied by flared end 37 of the flange a friction fit and mechanical locking results so that seal 30 is secured against axial displacement and will not become loosened by expansion and contraction.

To insure a firmer fit with flange 14, particularly in applications where bore 22 does not extend beyond the outer annular surface of axially directed portion 33, seal 30 may be provided with a second axially directed portion 40, as shown in FIG. 5. Portion 40 is coaxial with portion 33 and inwardly spaced therefrom so that flange 14 is engaged on both sides with an interference fit. As in the embodiment of FIG. 3, notch or groove 39 is provided to receive lip 37 and a contact seal is made with shaft 24 by radially extending lip 35 of seal 30. The configuration of FIG. 5 provides protection against axial displacement and will not become loosened by expansion and contraction without reliance on an interference fit with the inner diameter of bore 22.

As can be seen from FIGS. 3–5, flared end 37 of flange 14 is directed radially outwardly and a reduced opening exists between the axial end of the flange and the bore of the structure utilizing the bearing. In addition, areas of axially directed portion 33 of seal 30 which are directed inwardly upon assembly with the bearing may be provided with an increased cross-section by providing a groove on its inner surface to receive flared end 37 and/or by providing a relief on its outer surface. Thus, when in operating installation a mechanical locking results which, in combination with the friction fit that seal 30 makes with flange 14 and bore 22, is extremely effective in preventing seal 30 from being axially displaced by lubricant pressure and other forces. Prior to operating installation the friction fit between seal 30 and flange 14 serves to secure and position the seal on the bearing shell housing for convenience of handling and ease of assembly with a mating bore.

In instances where exclusion of axially directed foreign particles from the bearing assembly is of prime importance lip portion 35 of seal 30 may be directed angularly outwardly of the axial ends of the bearing assembly, as shown in FIG. 6. In this modification seal 30 may be secured to the assembled bearing in the manner of any of the embodiments of FIGS. 3–5, with a seal similar to that of FIG. 3 shown for the purposes of illustration. With lip portion 35 directed angularly outwardly, axially directed foreign particles tend to increase the pressure of the contact seal with shaft 24, thus providing a positive contact for the exclusion of such particles. Because of the resiliency of lip 35, lubricant is also retained in the bearing assembly.

FIG. 7 illustrates the manner in which a thin-walled shell housing having an outer raceway for a full complement of rollers may be provided with end seals. Shell housing 11 is provided with flange 14 in the manner previously discussed, with offset portion 21 providing a surface for axial guidance of rollers 20 positioned around the inner periphery of the shell housing. The other axial end of housing 11 has a radially inwardly extending flange 16a to provide axial guidance for the other end of rollers 20. Sealing means 30, which is shown as the type of FIG. 3 for purposes of illustration, is then affixed to flange 14 to provide axial end seals as discussed above. For ease of assembly rollers 20 may be held or secured in position around the raceway of housing 11 by the adhesive effect of a highly viscous lubricant to allow shaft 24 to be inserted in the bearing.

Although specific embodiments are shown with seal 30 on one end of an assembled bearing, it is to be understood that flange 14 may be provided on both axial ends of shell housing 11 so that seal 30 may be provided on both ends of the assembly. In addition, in applications where shaft 24 does not extend completely through the bearing assembly, one end of housing 11 may be completely closed, with a sufficient offset provided in the enclosure to provide a shoulder to maintain retention cage 12 in a land-riding relationship.

Examples of various completed bearing assemblies are best shown in FIGS. 8–10, wherein like reference numerals refer to like elements as FIGS. 1–7. Although these assemblies utilize a retention cage, it should be obvious that modifications of the type exemplified in FIG. 9 may be made in applications where a full complement of rollers is preferred. FIG. 8 is a perspective view of a completed bearing assembly with seal 30 provided on one end thereof while in FIG. 9 one end of the assembled bearing is closed by end plate 48 which is integral with outer housing 11. An offset shoulder 49 is provided to correspond with flange 14 so that rim 13 of cage 12 may be provided in a land-riding relationship. In FIG. 10 a flange such as flange 14 is provided on both ends of outer housing 11 and two sealing rings 30, one the mirror image of the other, are provided so that axial end seals are utilized at both ends of the bearing assembly.

It should be noted, that as illustrated in each of the embodiments of FIGS. 8–10, seals 30 can be conveniently snapped on flange 14 and retained thereby either by a pressure fit or by engagement of flared end 37 in annular notch 39. Thus, a unit assembly including housing 11, retention cage 12, rollers 20 and seals 30 can be provided for convenience of shipping and handling. The entire unit can then be conveniently inserted into the bore of a structure utilizing the bearing without the bothersome problem of separately assembling individual parts. In addition, because of the flexibility of lip portion 35 of seal 30, a shaft or rotating member such as shaft 24 can be conveniently inserted into the bearing assembly once it is pressed into place in bore 22.

The invention provides, therefore, an economical sealed bearing assembly utilizing a thin-walled housing containing needles or rollers with precision, high load capabilities. The sealing means does not substantially add to the cost of the bearing assembly, is compact, provides a positive contact seal for maximum bearing protection, and may be easily secured to an assembled unit for ease of handling and assembly in an operating installation.

I claim:

1. In a machine assembly having a shaft and a part including a bore with a wall mounted concentric to one another and with the shaft rotatable in the bore and adapted to receive a preassembled roller bearing around the shaft and within the bore, the improvement comprising a preassembled roller bearing including in combination a housing member having a raceway portion snugly positioned at its outside-surface-portion against the wall of the bore and having rollers retained in the raceway portion in engagement with the shaft, said housing member having spaced away from the bore wall an integral flange portion which extends in an axial direction in the bore away from said outside surface portion a dimension less than the axial length of the bore wall, said flange portion having a radially and angularly bent lip at the end thereof, sealing means for said roller bearing at said integral flange portion of said housing member for sealing the same against the passage through the bearing of lubricant and contaminants and for also sealing the bore over its full radial dimension at the portion of said bore corresponding in position therein to the housing-member-flange-portion, said sealing means comprising a one-piece molded nylon member having a body portion and a yieldable lip portion with a groove between the first two named portions, said body portion being positioned over said flange-portion lip and extending axially substantially over said entire flange portion with the extremity of said lip in the groove of said sealing means and with the body portion thereof fitted snugly in a friction fit between the integral flange portion and the bore wall and with the yieldable lip portion of said molded nylon member resiliently engaging said shaft, said sealing means being retained snugly in said machine assembly bore by said bore wall and the integral flange portion against radial displacement and being retained by the connection of the flange-portion lip at the groove against displacement in an axial direction within said bore.

2. In a machine assembly including a machine housing member having a bore and a shaft spaced away from the inside wall of said bore and rotatable therewithin, the improvement comprising a preassembled roller bearing including in combination a circular housing member having an annular raceway portion with rollers retained therein for engagement with the shaft and with an outside surface on the raceway portion for a snug fit engagement with the bore wall, said circular housing member having an integral flange portion which extends in an axial direction away from said outside surface portion and annularly in a dimension of lesser diameter than the diameter of said outside surface portion on said circular housing member, said flange portion having an annular lip at the end thereof bent radially and angularly outwardly to a dimension within said outside surface diameter, sealing means for said roller bearing at said integral flange portion of said circular housing member for sealing the same against the passage through the bearing of lubricant and contaminants and also adapted for sealing the bore of the machine housing member over its full radial dimension, said sealing means comprising an annular one-piece molded nylon member having a body portion and a resilient lip portion with a groove portion between the first two named portions, said body portion having a greater radial dimension than said resilient lip portion, said body portion being positioned over said annular bent lip and extending axially over said flange portion substantially the full length of the latter with the extremity of said annular bent lip in the groove of said sealing means and with the body portion thereof adapted to fit snugly in a friction fit between said integral flange portion and the bore wall, with said resilient lip portion of said molded nylon member positioned annularly inwardly toward said raceway portion of said housing member and adapted to resiliently engage the shaft, and said sealing means on said bearing adapted to be retained snugly in the machine housing member between the bore wall and said integral flange portion of said circular housing member against radial displacement and adapted to be retained by the connection of the annular bent lip at the groove against displacement in an axial direction within the machine housing member bore.

3. In a machine assembly having a shaft and a part including a bore with a wall mounted concentric to one another and with the shaft rotatable in the bore and adapted to receive a preassembled roller bearing around the shaft and within the bore, the improvement comprising a preassembled roller bearing including in combination a housing member having a raceway portion, said housing member being snugly positioned at its outside-surface-portion against the wall of the bore and having rollers retained in the raceway portion in engagement with the shaft, said housing member having spaced away from the bore wall an integral flange portion which extends in an axial direction in the bore away from said outside surface portion a dimension less than the axial length of the bore wall, said flange portion having a radially and angularly bent lip at the end thereof, sealing means for said roller bearing at said integral flange portion of said housing member for sealing the same against the passage through the bearing of lubricant and contaminants and for also sealing the bore over its full radial dimension at the portion of said bore corresponding in position therein to the housing-member-flange-portion, said sealing means comprising a one-piece molded nylon member having a body portion, a yieldable lip portion, and a portion having a cross-section reduced from said body portion intermediate the first two named portions, said body portion being positioned over said angularly bent lip, extending in an axial direction substantially over the length of said flange portion, and fitted snugly in a friction fit between the integral flange portion and the bore wall, with the extremity of said bent lip contacting said reduced cross-section portion of said sealing means, said yieldable lip portion of said molded nylon member extending at an angle inwardly from said reduced cross-section toward the rollers in the bearing and resiliently engaging said shaft at the inner extremity of the yieldable lip portion, said sealing means being retained snugly in said machine assembly bore by said bore wall and the integral flange portion against radial displacement and being retained by the connection of the angularly bent lip at the portion of reduced cross-section against displacement in an axial direction within said bore.

4. The sealing means in the machine assembly of claim 3 wherein said reduced cross-section portion and said body portion have a common flat surface, said flat surface of said reduced cross-section portion contacting said angularly bent lip to cant said body portion of said sealing means into engagement with the integral flange portion and the bore wall in a snug friction fit therewith, and to lock the same against axial displacement.

5. The machine assembly of claim 3 wherein said sealing means further includes a second axially directed portion in addition to said body portion, said second portion being coaxial with and inwardly spaced from said body portion so that said integral flange portion of said housing member is engaged on both sides thereof by said body portion and said second portion of said sealing means in an interference fit therewith.

References Cited by the Examiner
UNITED STATES PATENTS

| | | | |
|---|---|---|---|
| 1,510,806 | 10/1924 | Snider | 308—36.1 X |
| 2,544,541 | 3/1951 | McCarthy | 74—18.2 |
| 2,794,693 | 6/1957 | Burkhalter | 64—17 |
| 2,893,770 | 7/1959 | Poncet | 277—182 |
| 2,955,002 | 10/1960 | Rich | 277—205 X |

FOREIGN PATENTS

| | | |
|---|---|---|
| 508,701 | 2/1952 | Belgium. |
| 615,689 | 3/1961 | Canada. |
| 1,069,480 | 11/1959 | Germany. |
| 848,715 | 9/1960 | Great Britain. |

References Cited by the Applicant
UNITED STATES PATENTS

| | | |
|---|---|---|
| 2,321,250 | 6/1943 | Russell. |
| 2,467,099 | 4/1949 | Smith. |
| 2,779,640 | 1/1957 | Jones. |
| 2,897,581 | 8/1959 | Cowles et al. |
| 2,994,571 | 8/1961 | Peras |
| 3,007,752 | 11/1961 | Gales |
| 3,014,768 | 12/1961 | Dickinson |
| 3,070,413 | 12/1962 | Sommer. |
| 3,120,983 | 2/1964 | Sommer. |

DAVID J. WILLIAMOWSKY, *Primary Examiner.*

DON A. WHITE, *Examiner.*

L. L. JOHNSON, *Assistant Examiner.*